(12) United States Patent
Chang et al.

(10) Patent No.: US 6,436,221 B1
(45) Date of Patent: Aug. 20, 2002

(54) METHOD OF IMPROVING FIELD EMISSION EFFICIENCY FOR FABRICATING CARBON NANOTUBE FIELD EMITTERS

(75) Inventors: Yu-Yang Chang, Tainan; Jyh-Rong Sheu, Hsinchu; Cheng-Chung Lee, Taitung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/779,295

(22) Filed: Feb. 7, 2001

(51) Int. Cl.⁷ .............................. B32B 31/00; H01J 1/30
(52) U.S. Cl. ................ 156/247; 156/89.11; 156/89.12; 156/89.25; 156/89.26; 156/277; 445/46; 445/50; 445/51; 313/306; 313/495
(58) Field of Search ........................... 156/89.11, 89.12, 156/89.25, 89.26, 247, 277, 306.3, 344; 445/46, 50, 51; 313/306, 495

(56) References Cited

U.S. PATENT DOCUMENTS

| | | | |
|---|---|---|---|
| 5,616,368 A | * | 4/1997 | Jin et al. |
| 5,726,524 A | * | 3/1998 | Debe ..................... 313/310 X |
| 5,973,444 A | * | 10/1999 | Xu et al. |
| 6,019,656 A | * | 2/2000 | Park et al. |
| 6,020,677 A | * | 2/2000 | Blanchet-Fincher et al. ........................ 445/51 X |
| 6,057,637 A | * | 5/2000 | Zetti et al. |
| 6,097,138 A | * | 8/2000 | Nakamoto |
| 6,146,230 A | * | 11/2000 | Kim et al. ..................... 445/51 |
| 6,239,547 B1 | * | 5/2001 | Uemura et al. ............. 313/495 |
| 6,250,984 B1 | * | 6/2001 | Jin et al. ....................... 445/51 |
| 6,277,318 B1 | * | 8/2001 | Bower et al. |
| 6,283,812 B1 | * | 9/2001 | Jin et al. .................. 445/51 X |
| 2001/0007783 A1 | * | 7/2001 | Lee et al. |

FOREIGN PATENT DOCUMENTS

JP       2001-35362     *   2/2001

* cited by examiner

Primary Examiner—Curtis Mayes
(74) Attorney, Agent, or Firm—Blakely Sokoloff Taylor & Zafman LLP

(57) ABSTRACT

A method of CNT field emission current density improvement performed by a taping process is disclosed. The method comprises following steps. First of all, a conductive pattern coated on a substrate by screen-printing a conductive slurry containing silver through a patterned screen is carried out. Thereafter, a CNT layer is attached thereon by screen-printing a CNT paste through a mesh pattern screen to form CNT image pixel array layer. The CNT paste consists of organic bonding agent, resin, silver powder, and carbon nano-tubes. After that the substrate is soft baked by an oven using a temperature of about 50–200° C. to remove volatile organic solvent. A higher temperature sintering process, for example 350–550° C. is then carried out to solidify the CNT on and electric coupled with the conductive pattern. Finally, an adhesive film is closely attached on the cathode substrate and then remove the adhesive film away so as to remove those badly bonding CNT portions and to vertically pull up a portion of CNT which originally laid down on the surface of CNT layer after sintering. Consequently, the current density, brightness, and uniformity of the emitter sources are significantly improved.

9 Claims, 2 Drawing Sheets

METHOD OF IMPROVING FIELD EMISSION EFFICIENCY FOR FABRICATING CARBON NANOTUBE FIELD EMITTERS

FIELD OF THE INVENTION

This invention relates to a field emission display, more particularly to a method of improving field emission efficiency of carbon nanotube field emitters by using a taping film.

BACKGROUND OF THE INVENTION

Nanotube field emission display comprises an image pixel array formed on a substrate having conductive patterned thereon as a cathode, and a corresponding phosphor pattern coated on an ITO glass as an anode. Each image pixel contains carbon nanotube (hereinafter called CNT) layer thereon as electron emission sources. The CNT layer made of a slurry consists of organic bonding agent, silver powder, and CNT, which having 5–100 nm in diameter and 1000–3000 nm in length. The principle of field emission is in terms of electric field accelerating cold electron which is emitted from the tip of CNT through vacuum space and bombards anode which is an indium tin oxide (ITO) substrate having phosphor pixel to generate fluorescence. By contrast to conventional cathode ray tube which is in terms of thermionically emitted electrons emerge from a tungsten wire, the field emission modeling has quite different fashion.

A typical field display schematic cross-sectional view is shown in FIG. 1. The figure shows a conductive line array 20 coated on a substrate 10 by screen-printing a conductive slurry containing silver through a line-patterned screen. Thereafter, a CNT layer is attached thereon by screen-printing a CNT paste through a mesh patterned screen to form image pixel layer 30. The CNT paste consists of organic bonding agent, resin, carbon nano-tubes, and silver powder. After that the substrate is soft baked in an oven using a temperature of about 50–200° C. to remove volatile organic solvent. Finally a higher temperature sintering process is carried out to cure the CNT on and to electric coupled with the conductive silver lines. In the sintering process, all of the organic bonding agent and resin are burned out.

The cost of the above fabricating process is low and it is not a mere benefit. Field emission display can have very thin electron gun of only about 0.2 mm in thickness. In addition, the size of planar area can have very flexible, it can be very small such as 1 $cm^2$ and can as large as several hundred centimeter square. The CNT-FED is thus a prominence for an ultra thin flat panel display. For a display, the stability and long life reliability are fundamental characteristics. However, as high as 10–100 $mA/cm^2$ in current density is a minimum criteria and the most critical characteristic for generating sufficient brightness and uniformity for a display. To approach such current density, the lower intensity electrical field is preferred. Preferably, it should be lower than 5 $V/\mu m$.

Since the electric property (current density vs. intensity of electric field) is predetermined by a number of exposed CNT, which should be electric coupled with the conductive layer 20 of the cathode. However aforementioned CNT field emission device of prior art in general emits very low current density unless using extra processes and/or using high electric field intensity. Please refer to FIG. 2, showing a curve 110 by using conventional process and another curve 120 in accordance with the present invention. In figure, the current density versus electric field is shown. The conventional process has a current density lower than 1 $mA/cm^2$ for intensity of electric filed of about 6$V/\mu m$. To achieve 10–100 $mA/cm^2$ in current density emission exerting rather high electric field intensity is usually expected.

Thus, as acquired knowledge known by the inventor, none of issued invention discloses a CNT emission display, which can approach the goal of producing the critical current density in the electric field intensity as low as 6$V/\mu m$. U.S. Pat. No. 5,616,368, issued to Jim, et al., disclose a patent about field emission display. Jim, et al. proposed that using activated ultra-fine diamond particulate as emission sources for field emission source can significantly improving the prior art of their patent. As stated in Jim's patent, ultra-fine diamond particulate has a low or negative electrical affinity, and thus can act as field emitter in low electric field. An electric field of more than 70$V/\mu m$ is needed for typical p-type doped diamond substrate to generate an emission current density of 10 $mA/cm^2$. In Jim's patent, a field of about 12$V/\mu m$ or even down to 5$V/\mu m$ is required to achieve the critical current density.

The method of Jim, et al comprises the following steps. First, diamonds, predominantly having maximum dimensions in the range of 5–10,000 nm are prepared. Prior to paste the particulate emitters to the substrate, the ultra-fine particles are exposed in a plasma containing hydrogen at a temperature in excess of 300° C. In order to minimize agglomerations of the particles during the plasma activating processing and in order to have relative uniform activation on major part of the exposed diamond surface, the particles in continuous motion by injecting high speed gas flow is performed. In addition, the diamond particles have less than 10 volume percent of graphitic or amorphous carbon phases. Thereafter the diamonds particles with bond agent are mixed and screen-print to a predetermined conductive trace containing substrate. Finally, a sintering process at a temperature of about 500° C. is performed to form pixels.

As forgoing prior art, for CNT there is not available method present to improve the problem of the high electric filed needed unless using the ultra-fine diamond particles. In addition, the method to alleviate agglomeration of the particles proposed by the prior art is done agglomerated again after slurry prepared and sintering process is not sure. Thus the present invention is to improve the CNT field emitter. Furthermore, CNT field emitter improvement by the present invention has lower cost and easily to implement.

SUMMARY OF THE INVENTION

The present invention is to propose a simple CNT field emitter forming method, which significantly improves the efficiency of CNT.

The present invention discloses a method of CNT emitter current density improvement by a taping process. The method comprises following steps. First of all, a conductive pattern coated on a substrate by screen-printing a conductive slurry containing silver through a patterned screen is carried out. Thereafter, a CNT layer is attached thereon by screen-printing a CNT paste through a mesh pattern screen to form CNT image pixel array layer. The CNT paste consists of organic bonding agent, resin, silver powder, and carbon nano-tubes. After that the substrate is soft baked by an oven using a temperature of about 50–200° C. to remove volatile organic solvent. A higher temperature sintering process, for example 350–550° C. is then carried out to solidify the CNT on and electric coupled with conductive pattern. Finally, an adhesive film is closely attached on the cathode substrate and is then removed the adhesive film away so as to remove those badly bonding CNT portion and to vertically pull up a portion of CNT which originally laid down on the surface after sintering. Consequently, the current density, brightness, and uniformity of the emitter sources are significantly improved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The aforementioned fabricating process for a CNT field emission display descried in the background of the invention high electric field intensity is required to generate sufficiently current density. For ultra-fine particulate diamond, though the electric filed can be drastically down to an accept range, but complicate processes are demanded. Besides, the fine particles are processed though gas flow and hydrogen containing plasma. However, after screen-printing and sintering, none of any further improve method is promoted. The effect is expected to be discount and degrade the quality of the field emission device.

The present invention proposes a surface treatment with simple but can be available to improve forgoing issues.

The inventors investigated that the low current density for the conventional screen print CNT process is due to following reasons: One is due to some of the CNT emitter sources still not exposed but buried in the CNT layer, which do not have current density contribution. The other is due to the fact that the upper portion of CNT layer on the conductive silver layer has a poor adhere quality. As a result, the portions of the badly attached CNTs are attracted to the anode and then damage the phosphor layer.

Hence, the inventors propose following processes.

In a preferred embodiment, the CNT layer formed is carried out as aforementioned background of the invention. After screen print, the conductive line array of about 50–150 $\mu$m in interval and 150–300 $\mu$m each in width is formed. Each of the field pixel is about 0.02–0.09 mm$^2$ are formed. The soft baked temperature is about 50–200° C. to remove away organic volatile solvent. A taping process is performed by using adhesive film such as tape with adhesive material thereon or polymer film with static electrical attractive material on the CNT substrate through a laminator to closely attach on the CNT layer and the adhesive film or the polymer film are pulled up and removed away. The process can remove some badly attached CNT. Some of the CNT buried in the CNT layer is also pull up to a proper direction.

Thereafter, a sintering process at a temperature of about 350–550° C., is performed. A taping process is done to remove a portion of poor attached CNT on the substrate. The taping process can apply by a laminator or by a rubbing process or a press print to closely attach the adhesive film to the surface of the CNT film. It is found the contribution of the taping process to the current density improvement after sinter is more notable then after soft baked. The taping process after soft baked is thus an optional process.

Figure 1:
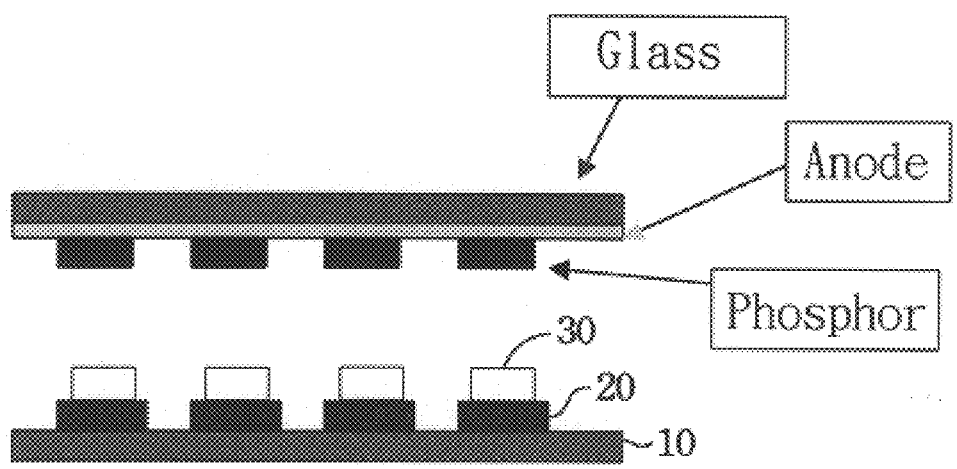
FIG. 1 illustrates a schematic structure of CNT field emission display.
Figure 2:
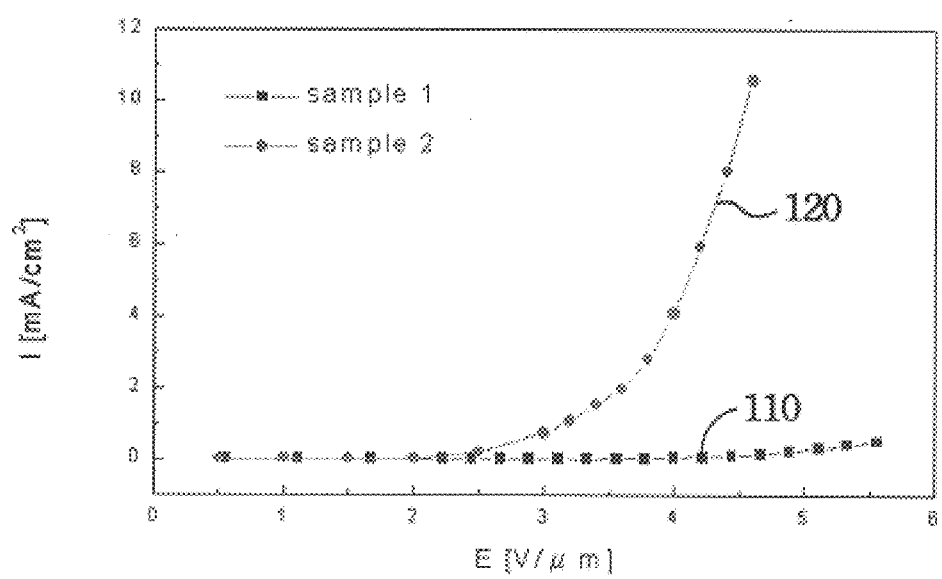
FIG. 2 illustrates a comparison of current density versus electric field intensity performance for the CNT cathode substrate with taping and without taping.

FIG. 2 shows a comparison of curves 110 and 120 of current density vs. electric field intensity for a CNT field emitter formed by a conventional method without taping process and formed by the present invention (the conventional method but associate with taping process, respectively). With taping process, the current density is found to be higher than 10 mA/cm$^2$ for electric field intensity of about 5V/$\mu$m. However, without taping process, the current density is still lower than 1 mA/cm$^2$ even for electric field intensity of about 6V/$\mu$m. The result shows the present invention has protruding effect.

Figure 3:
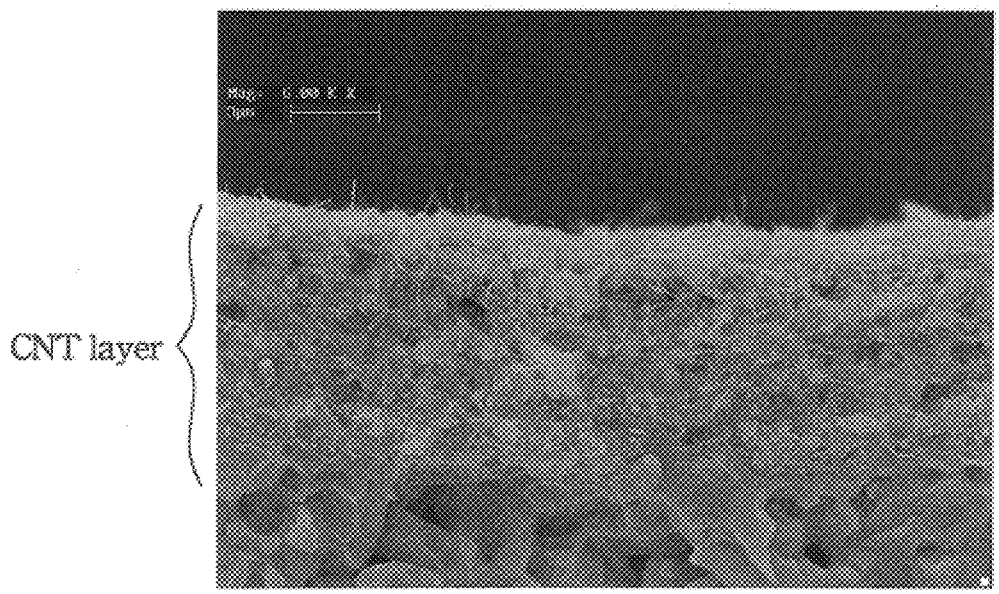
FIG. 3 illustrates a SEM image of CNT cathode after sintering process without taping.
Figure 4:
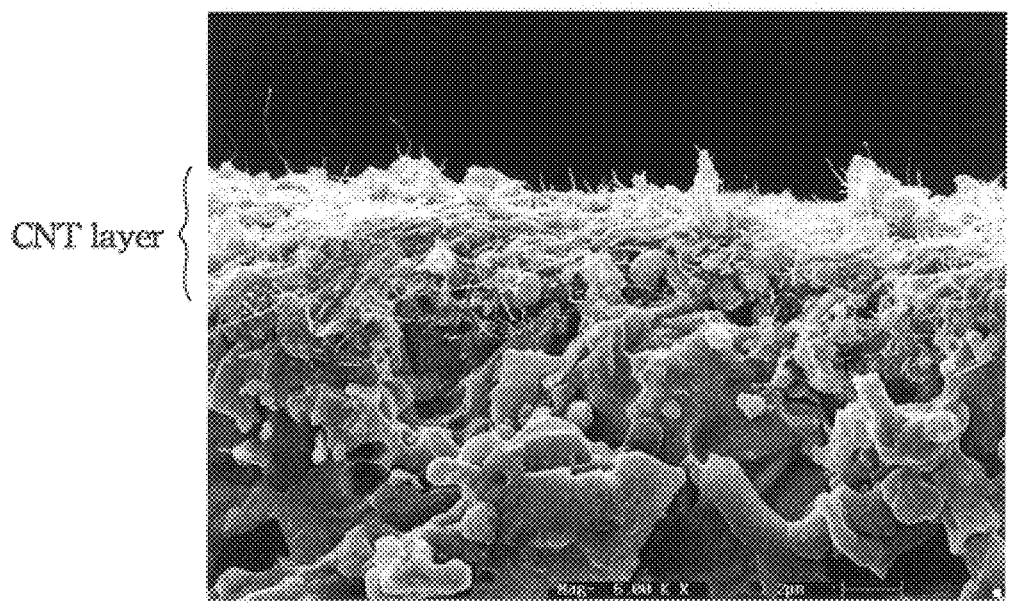
FIG. 4 illustrates a SEM image of CNT cathode after sintering process with taping.

FIG. 3 shows a cross-sectional view of CNT emitter pixel without taping process to the CNT cathode, inspecting by scanning using electron microscope. FIG. 4 shows a cross-sectional view image with a taping process to the CNT cathode. By comparing FIG. 3 with FIG. 4, the CNT layer for taping CNT emitter pixel is thinner than that of without taping. It proves that a portion of the CNT layer with badly attached on cathode is removed through the taping process. In addition, some of the buried CNT emitter sources can also be pulled up to a proper directionally.

The present invention provides the following benefits:

(1) The current density of CNT emitter source can be significantly increased at low electric field intensity without complicated process but by a simple taping process.

(2) The taping process is a low cost and easier process, and no high accuracy instrument and complicated parameter are demanded.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A method of improving current density for a carbon nanotube(CNT) emitter source, said method comprising the steps of:

forming a CNT layer by screen-printing a CNT paste through a patterned mesh onto substrate, wherein a plurality of conductive pattern is formed thereon so as to form emitter pixel array;

performing a soft bake process to said substrate;

performing a sintering process; and performing a taping process.

2. The method according to claim 1, wherein said step of performing a taping process comprises the steps of forming an adhesive film on said substrate; and pulling said adhesive film up and stripping away so as to remove a portion of poorly attached CNT layer.

3. The method according to claim 1, after soft bake step further comprising performing a taping process to further increase said current density in the same electric field intensity.

4. The method according to claim 1, wherein said step of performing said soft bake process is done at a temperature of about 50–200° C.

5. The method according to claim 1, wherein said step of performing said sintering process is done at a temperature of about 350–550° C.

6. The method according to claim 1, wherein said step of performing a taping process is done by (1) laminating a film which has a static electrical attractive material formed thereon on said substrate by the use of a laminator and (2) pulling said polymer film up and stripping away.

7. The method according to claim 1, wherein said step of performing a taping process is done by (1) laminating an adhesive film on said substrate by using a laminator and (2) pulling said adhesive film up and stripping away.

8. The method according to claim 1, wherein said step of performing a taping process is done by (1) press printing an adhesive film to a surface of said CNT layer and (2) pulling said adhesive film up and stripping away said adhesive film.

9. The method according to claim 1, wherein said step of performing a taping process is done by (1) press printing a film which has a static electric attractive material formed thereon on a surface of said CNT layer by using a laminator and (2) pulling said film up and stripping away.

* * * * *

UNITED STATES PATENT AND TRADEMARK OFFICE
CERTIFICATE OF CORRECTION

PATENT NO. : 6,436,221 B1
DATED : August 20, 2002
INVENTOR(S) : Chang et al.

It is certified that error appears in the above-identified patent and that said Letters Patent is hereby corrected as shown below:

Title page,
Item [56], References Cited, U.S. PATENT DOCUMENTS, delete
"Zetti et al." and insert -- Zettl et al. --.
Item [57], ABSTRACT,
Line 11, delete "of about 50-200° C." and insert -- of about 50-200 °C --.
Line 13, delete "for example 350-550° C." and insert -- for example 350-550 °C --.

Signed and Sealed this

Seventh Day of February, 2006

JON W. DUDAS
*Director of the United States Patent and Trademark Office*